（12）United States Patent
Miyake

(10) Patent No.: US 9,618,052 B2
(45) Date of Patent: Apr. 11, 2017

(54) INTERMEDIATE SHAFT

(71) Applicant: JTEKT CORPORATION, Osaka-shi, Osaka (JP)

(72) Inventor: Kazunori Miyake, Kitakatsuragi-gun (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/833,438

(22) Filed: Aug. 24, 2015

(65) Prior Publication Data

US 2016/0069395 A1   Mar. 10, 2016

(30) Foreign Application Priority Data

Sep. 4, 2014   (JP) .................................. 2014-180535

(51) Int. Cl.
| B62D 1/16 | (2006.01) |
| C10M 105/26 | (2006.01) |
| F16C 3/02 | (2006.01) |
| F16D 3/06 | (2006.01) |
| F16D 1/10 | (2006.01) |
| B62D 1/20 | (2006.01) |

(52) U.S. Cl.
CPC ............... *F16D 1/101* (2013.01); *B62D 1/16* (2013.01); *B62D 1/20* (2013.01); *C10M 105/26* (2013.01); *F16C 3/023* (2013.01); *F16D 3/06* (2013.01); *C10M 2207/10* (2013.01); *C10M 2207/125* (2013.01); *C10N 2210/00* (2013.01); *C10N 2210/02* (2013.01); *C10N 2230/06* (2013.01); *C10N 2230/76* (2013.01); *C10N 2250/08* (2013.01); *C10N 2250/18* (2013.01); *F16D 2001/103* (2013.01); *F16D 2300/10* (2013.01); *Y10T 403/7026* (2015.01)

(58) Field of Classification Search
CPC . B62D 1/16; B62D 1/185; B62D 1/20; C10M 2207/10; C10N 2210/00; C10N 2250/18; F16C 3/023; F16C 3/03; F16C 3/06; F16C 2226/80; F16D 1/02; F16D 1/101; F16D 3/06; F16D 2001/103; F16D 2300/10; Y10T 403/7026; Y10T 403/7032; Y10T 403/7033; Y10T 403/7035
USPC ............. 464/16, 74, 75, 158, 159, 162, 180; 403/359.1, 359.4–359.6
See application file for complete search history.

(56) References Cited

U.S. PATENT DOCUMENTS

| 8,419,555 B2 * | 4/2013 | Tokioka | .................... | F16D 3/06 |
| | | | | 464/162 |
| 8,753,215 B2 * | 6/2014 | Tokioka | .................... | F16D 3/06 |
| | | | | 464/162 |

FOREIGN PATENT DOCUMENTS

| EP | 1 7907 11 A1 | 5/2007 |
| EP | 2 282 071 A2 | 2/2011 |
| JP | 2012-117560 A | 6/2012 |

OTHER PUBLICATIONS

Feb. 19, 2016 Extended Search Report issued in European Patent Application No. 15183450.4.

* cited by examiner

*Primary Examiner* — Josh Skroupa
(74) *Attorney, Agent, or Firm* — Oliff PLC

(57) ABSTRACT

In an intermediate shaft for a steering system, the surface of external splines of an inner shaft is coated with a resin coating layer containing a base resin and two or more kinds of higher fatty acid metal salts having different melting point peaks from each other.

1 Claim, 9 Drawing Sheets

INTERMEDIATE SHAFT

INCORPORATION BY REFERENCE

The disclosure of Japanese Patent Application No. 2014-180535 filed on Sep. 4, 2014 including the specification, drawings and abstract, is incorporated herein by reference in its entirety.

BACKGROUND OF THE INVENTION

1. Field of the Invention

The present invention relates to an intermediate shaft that is incorporated in steering systems of automobiles.

2. Description of the Related Art

For example, an intermediate shaft is formed by coupling an inner shaft and a tubular outer shaft by spline fitting so that the inner shaft and the outer shaft can slide relative to each other in the axial direction (in a telescopic manner). The outer peripheral surface of external splines formed on the outer periphery of the inner shaft or the inner peripheral surface of internal splines formed on the inner periphery of the outer shaft is typically coated with a resin coating layer in order to substantially eliminate clearance between the external and internal splines to reduce rattling noise or to reduce backlash of a steering wheel during steering operation (see, e.g., Japanese Patent Application Publication No. 2012-117560 (JP 2012-117560 A)).

Polyamide resins having high mechanical strength and excellent self-lubricating properties, etc. are commonly used as a base resin of the resin coating layer.

In recent years, there has been a demand for an intermediate shaft that is conventionally disposed in passenger compartments of automobiles to be disposed in engine compartments etc. where the ambient temperature can become high. The resin coating layer is therefore required to have higher heat resistance. As the resin expands with an increase in temperature, the pressure on the contact surface of the resin coating layer increases accordingly. A sliding load therefore tends to increase with an increase in temperature. Accordingly, it is particularly required to further reduce friction under the high temperature conditions.

Moreover, the resin coating layer is required to maintain satisfactory sliding properties for a period as long as possible particularly in a wide range of ambient temperatures from around normal temperature before starting of an engine to a high temperature during driving of the engine (about 140° C.). However, conventional resin coating layers made of only a base resin such as a polyamide resin are not suitable for use in the engine compartments because their sliding properties are significantly degraded in a high temperature range of 120° C. or more and such degradation in sliding properties results in increased wear.

SUMMARY OF THE INVENTION

It is an object of the present invention to provide an intermediate shaft that can be disposed even in, e.g., an engine compartment as a resin coating layer can maintain satisfactory sliding properties in a wide range of ambient temperatures for a long period of time.

According to an aspect of the present invention, an intermediate shaft includes: an inner shaft that has external splines formed on its outer periphery; a tubular outer shaft that has internal splines formed on its inner periphery so as to be fitted on the external splines, and that is coupled to the inner shaft by the fitting so as to be slidable relative to the inner shaft in an axial direction; and a resin coating layer that is formed on a surface of the external or internal splines and that contains a base resin and two or more kinds of higher fatty acid metal salts having different melting point peaks from each other.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
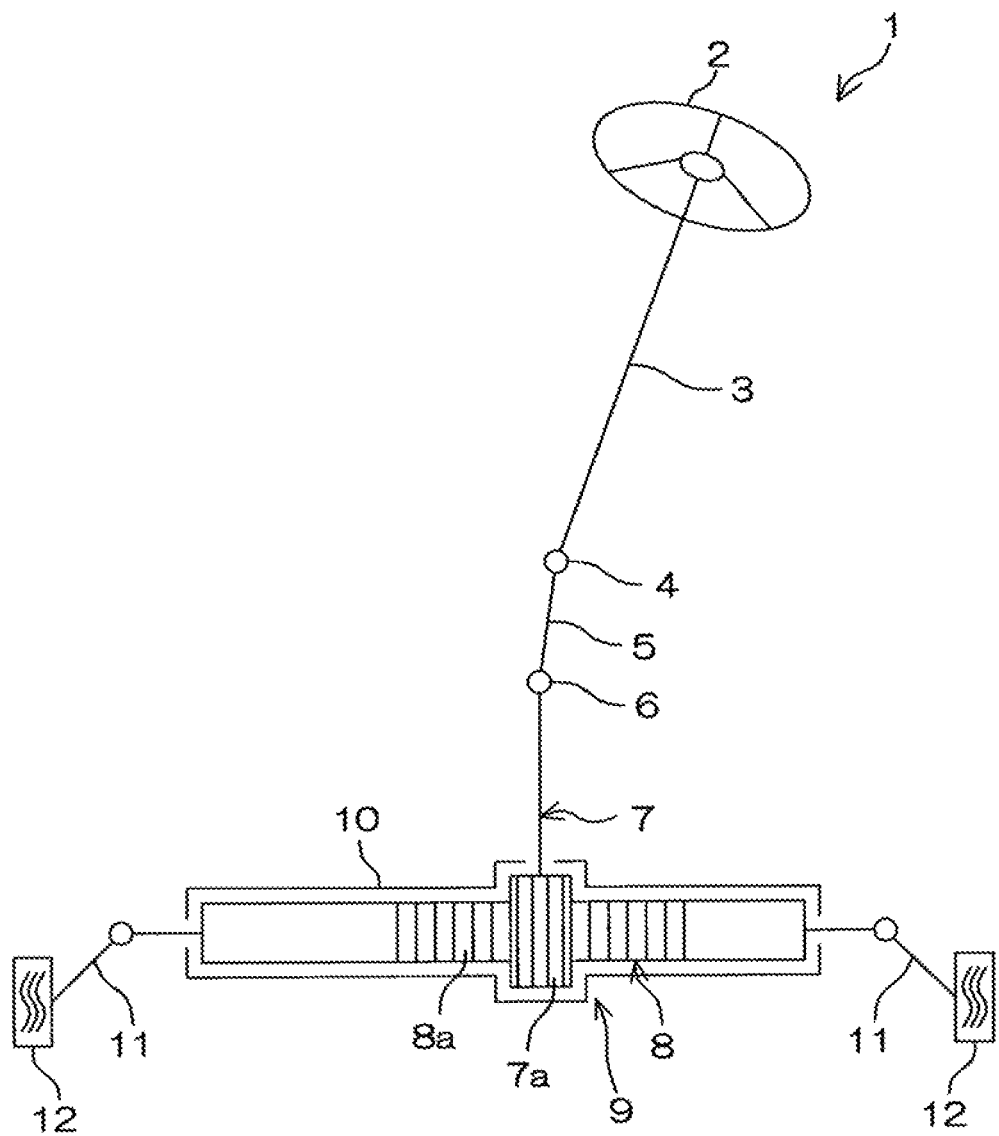
FIG. 1 is a schematic diagram of a steering system according to an embodiment of the present invention.

FIG. 1 is a schematic diagram of a steering system according to an embodiment of the present invention. Referring to FIG. 1, a steering system 1 includes a steering wheel 2, a steering shaft 3, an intermediate shaft 5, a pinion shaft 7, and a rack bar 8. The steering shaft 3 is coupled to the steering wheel 2 so as to be rotatable therewith. The intermediate shaft 5 is coupled to the steering shaft 3 via a universal joint 4. The pinion shaft 7 is coupled to the intermediate shaft 5 via a universal joint 6. The rack bar 8 is a steered shaft having rack teeth 8a that mesh with pinion teeth 7a of the pinion shaft 7 and extending in a lateral direction of an automobile.

The pinion shaft 7 and the rack bar 8 form a steering mechanism 9 as a rack-and-pinion mechanism. The rack bar 8 is supported in a rack housing 10 via a plurality of bearings, not shown, so that the rack bar 8 can make a linear reciprocating motion. The rack housing 10 is fixed to a vehicle body. Both ends of the rack bar 8 protrude from both sides of the rack housing 10, and tie rods 11 are coupled to the ends of the rack bar 8.

Each tie rod 11 is coupled to a corresponding one of turning wheels 12 via a knuckle arm, not shown. When a driver operates the steering wheel 2 and the steering shaft 3 rotates accordingly, this rotation is transmitted to the pinion shaft 7 via the universal joint 4, the intermediate shaft 5, and the universal joint 6. The rotation thus transmitted to the pinion shaft 7 is converted to a linear motion of the rack bar 8 in the lateral direction of the automobile by the pinion teeth 7a and the rack teeth 8a. The turning wheels 12 are thus steered.

Figure 2:
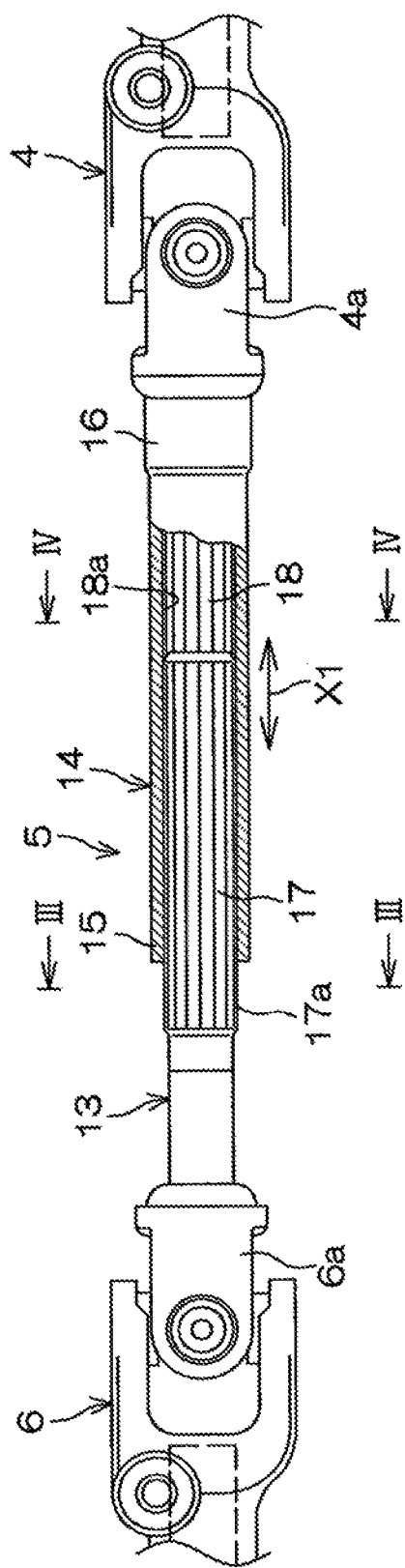
FIG. 2 is a sectional view of a main part of an intermediate shaft.

FIG. 2 is a sectional view of a main part of the intermediate shaft 5. Referring to FIGS. 1 and 2, the intermediate shaft 5 includes an inner shaft 13 and a tubular outer shaft 14. For example, the inner shaft 13 is a lower shaft, and the outer shaft 14 is an upper shaft. The upper end of the outer shaft 14 is coupled to a yoke 4a of the universal joint 4. The lower end of the inner shaft 13 is coupled to a yoke 6a of the universal joint 6.

Figure 3:
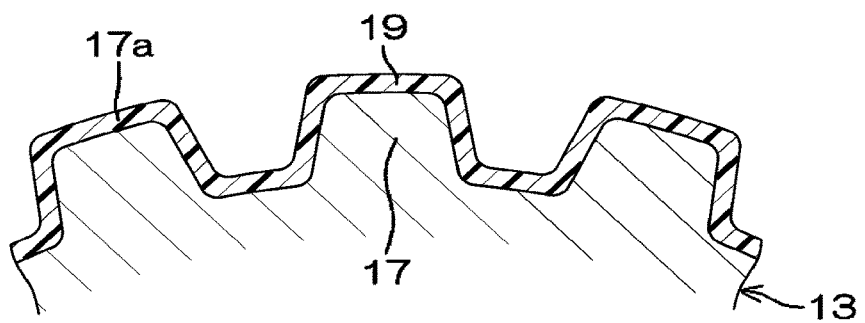
FIG. 3 is a sectional view taken along line III-III in FIG. 2.
Figure 4:
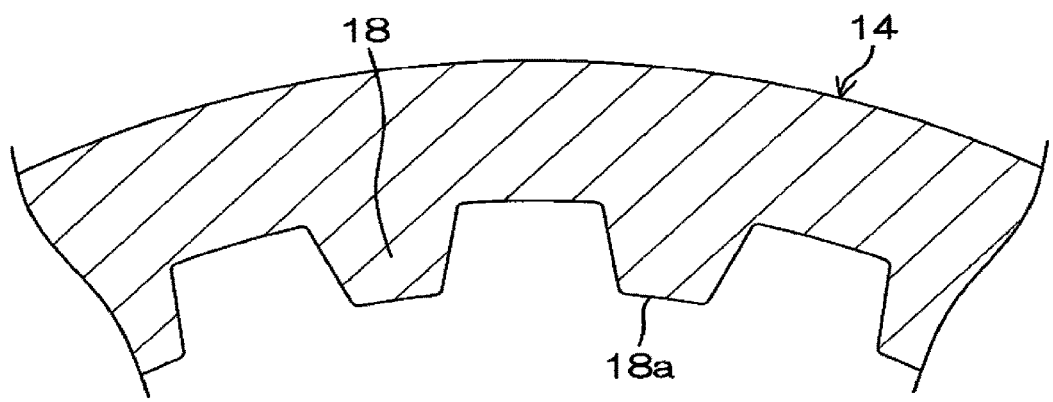
FIG. 4 is a sectional view taken along line IV-IV in FIG. 2.

The outer shaft 14 has a first end 15 as an open end and a second end 16 as a closed end. The second end 16 is coupled to an end of the yoke 4a of the universal joint 4 and is closed. FIG. 3 is a sectional view taken along line III-III in FIG. 2. FIG. 4 is a sectional view taken along line IV-IV in FIG. 2. Referring to FIGS. 2 and 3, external splines 17 parallel to an axial direction X1 are formed on the outer periphery of the inner shaft 13. Referring to FIGS. 2 and 4, internal splines 18 parallel to the axial direction X1 are formed on the inner periphery of the outer shaft 14 so as to be fitted on the external splines 17.

The inner shaft 13 is inserted into the outer shaft 14 from the first end 15 side of the outer shaft 14. Since the external splines 17 are fitted in the internal splines 18, namely since the inner shaft 13 is fitted in the outer shaft 14 by spline fitting, the inner shaft 13 can slide relative to the outer shaft 14 in the axial direction X1 and can rotate with the outer shaft 14. Referring to FIG. 3, a surface 17a of the external splines 17 is coated with a resin coating layer 19.

The resin coating layer 19 provides predetermined sliding resistance between the inner and outer shafts 13, 14. The resin coating layer 19 can substantially eliminate clearance between the inner and outer shafts 13, 14 to reduce rattling noise or to reduce backlash of the steering wheel 2 during steering operation. For example, the resin coating layer 19 is formed by powder coating such as fluidized bed coating. The resin coating layer 19 contains a base resin and two or more kinds of higher fatty acid metal salts having different melting point peaks from each other.

Various base resins that together with the higher fatty acid metal salts can form the resin coating layer 19 and that have heat resistance high enough for use in an engine compartment can be used as the base resin. Examples of the base resin include one kind or two or more kinds of engineering plastics, super engineering plastics, etc. that are compatible with each other, such as polyamide 610, polyamide 612, polyamide 11, polyamide 12, polyphenylenesulfide (PPS), polyetheretherketone (PEEK), amorphous polyarylate (PAR), polysulfone (PSF), polyethersulfone (PES), polyimide, polyetherimide (PEI), liquid crystal polymer (LCP), and fluororesin.

For example, the base resin may be polyamide 11, polyamide 12, etc. that are often used for an intermediate shaft to be disposed in vehicle compartments. In this case as well, satisfactory sliding properties can be maintained due to both the mechanism obtained by using the two or more kinds of higher fatty acid metal salts having different melting point peaks from each other, and satisfactory self-lubricating properties of polyamide 11, polyamide 12, etc. In particular, satisfactory sliding properties can be maintained in a wide range of ambient temperatures for a long period of time in the case where the intermediate shaft is disposed in, e.g., the engine compartment etc.

In order to further improve the heat resistance etc. of the intermediate shaft when disposed in the engine compartment etc., it is preferable to use any polyamide resin having a melting point of 210° C. or more out of those having excellent self-lubricating properties, and polyamide 610 is particularly preferred. If used by itself as a powder coating, polyamide 610 is less likely to smoothly melt and flow due to its high viscosity in a molten state and low fluidity after coating. According to the present invention, however, the higher fatty acid metal salts functioning as a fluidizer are added to the base resin. This can reduce the viscosity of the molten powder coating and can improve fluidity thereof.

A sufficiently thick resin coating layer can therefore be formed by, e.g., fluidized bed coating even on the inner surfaces of grooves between the splines etc. where a powder coating is less likely to reach. Moreover, satisfactory sliding properties can be maintained in a wide range of ambient temperatures for a long period of time due to both the mechanism obtained by using the two or more kinds of higher fatty acid metal salts having different melting point peaks from each other, and satisfactory self-lubricating properties of polyamide 610.

In particular, for example, two or more kinds of higher fatty acid metal salts having different melting point peaks from each other in the range of 80° C. to 140° C., both inclusive, are used out of salts of one or two kinds of higher fatty acids with 16 or more carbon atoms such as palmitic acid, stearic acid, oleic acid, linoleic acid, and linolenic acid and a metal such as calcium, magnesium, and zinc.

According to the present invention, a lubricating film is thus always present on the sliding surface of the resin coating layer in the wide range of ambient temperatures from around normal temperature to around 140° C. as described above, and satisfactory sliding properties can be maintained. The reason why the higher fatty acids with 16 or more carbon atoms are preferred is that sufficient lubrication may not be achieved by metal salts of higher fatty acids with less than 16 carbon atoms.

It is possible to use two or more kinds out of various higher fatty acid metal salts having a melting point peak in the above range of ambient temperatures. However, in view of lubricating properties and stability of the lubricating film, mutual compatibility in a molten state, affinity for the base resin, the function as a fluidizer etc. for the base resin, availability, handling properties, etc., it is particularly preferable to use one or two kinds of metal salts of palmitic acid, stearic acid, etc.

It is preferable to use two or more kinds of higher fatty acid metal salts whose melting point peaks have a temperature difference of 10° C. or more. In order to maintain satisfactory sliding characteristics in a wider range of ambient temperatures, it is more preferable to use as few kinds of higher fatty acid metal salts as possible.

Specific examples of the higher fatty acid metal salts include a compound given by the following chemical formula (1) where $M_1$ is Mg (melting point peak: about 94° C.), a compound given by the following chemical formula (1) where $M_1$ is Ca (melting point peak: about 124° C.), a compound given by the following chemical formula (2) where $M_2$ is Mg (melting point peak: about 116° C.), a compound given by the following chemical formula (2) where $M_2$ is Ca (melting point peak: about 140° C.), and a compound given by the following chemical formula (3) where $M_3$ is Mg (melting point peak: about 129° C.).

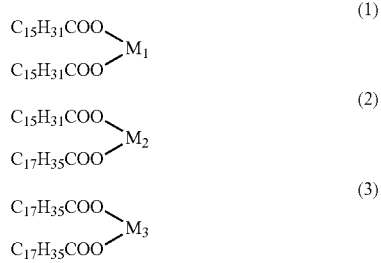

It is preferable that the total amount of two or more kinds of higher fatty acid metal salts to be added to the base resin be in the range of 0.05 mass % to 0.5 mass %, both inclusive, in particular in the range of 0.1 mass % to 0.3 mass %, both inclusive. Adding the two or more kinds of higher fatty acid salts in an amount less than this range does not achieve sufficient improvement in sliding properties of the resin coating layer, which may result in an increased friction coefficient or increased wear.

Adding the two or more kinds of higher fatty acid salts in an amount larger than this range has no further effect, but may rather result in increased wear due to reduced mechanical strength of the resin coating layer. In order to form the resin coating layer containing the base resin and the two or more kinds of higher fatty acid metal salts, powder coating such as fluidized bed coating is preferably used as in conventional examples.

In fluidized bed coating, a powder coating is first prepared by adding the two or more kinds of higher fatty acid salts to the base resin and kneading and then pulverizing the resultant mixture. Next, air etc. is introduced into a fluidizing tank to suspend and fluidize the prepared powder coating. The inner shaft 13 heated to the melting point of the base resin or higher is then dipped into the fluidized bed. The powder coating thus adheres to the surface 17a of the external splines 17 of the inner shaft 13 and melts and flows thereon. The molten powder coating is then cooled and solidified to form the resin coating layer 19.

Conditions for forming the resin coating layer 19 by fluidized bed coating can be similar to those in conventional examples. An underlying layer may be formed on the surface 17a before formation of the resin coating layer 19. For example, the underlying layer may be a layer formed by coating the surface 17a with a varnish of a curing resin such as epoxy resin or polyamide-imide resin and curing the varnish coating.

In particular, in the case of forming the intermediate shaft 5 for use in the engine compartment, namely the intermediate shaft 5 that is required to have high heat resistance, by using a combination of the underlying layer and the resin coating layer 19 made of polyamide 610, the underlying layer is preferably a layer formed by coating the surface 17a with a varnish of a curing resin mainly containing a polyamide-imide resin and curing the varnish coating. The thickness of the resin coating layer 19 is substantially the same as the size of the clearance between the external spline 17 of the inner shaft 13 and the internal spline 18 of the outer shaft 14. In the case of forming the underlying layer, the total thickness of the underlying layer and the resin coating layer 19 is substantially the same as the size of the clearance.

For example, the thickness is adjusted by cutting the resin coating layer 19 formed by fluidized bed coating. The resin coating layer 19 may be formed on a surface 18a of the internal splines 18 rather than on the surface 17a of the external splines 17. The coating layer need not be formed on both surfaces 17a, 18a. The steering system 1 incorporating the intermediate shaft 5 therein is not limited to the common steering system shown in FIG. 1, but may be various types of power steering systems such as a column electric power steering system. Various design modifications can be made without departing from the spirit and scope of the present invention.

Figure 5:
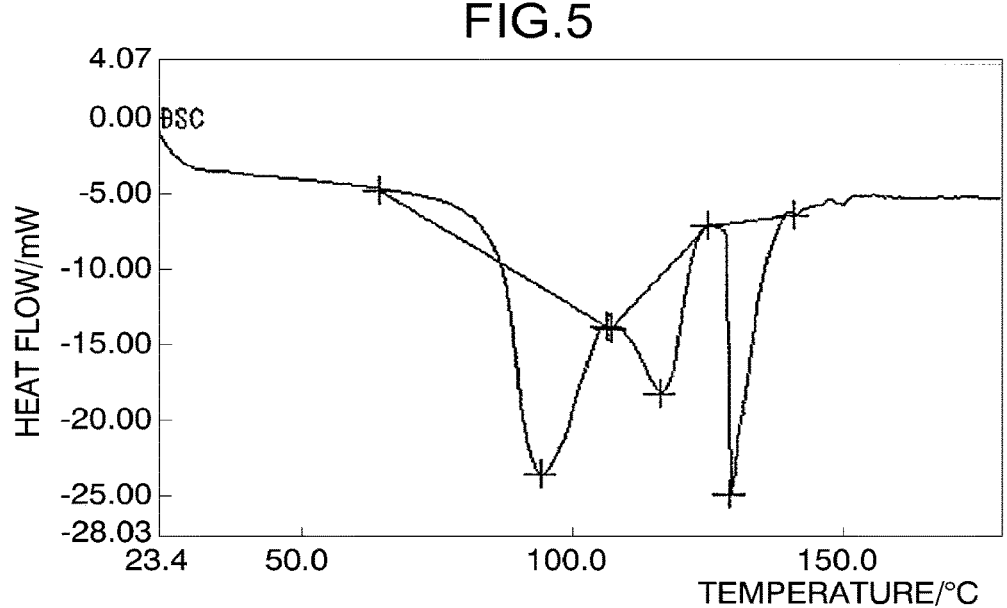
FIG. 5 is a graph showing the result of thermal analysis of a mixture of higher fatty acid metal salts contained in a powder coating prepared in Example 1 of the present invention.

In a powder coating of Example 1, a mixture of three kinds of higher fatty acid metal salts having melting point peaks at around 94° C., around 116° C., and around 129° C. as shown by the result of differential scanning calorimetry (DSC) thermal analysis in FIG. 5 was used as the higher fatty acid metal salts, and polyamide 610 was used as the base resin. The powder coating of Example 1 was prepared by adding 0.1 mass % of the mixture of the higher acid metal salts to polyamide 610 and kneading and then pulverizing the resultant mixture.

Figure 6:
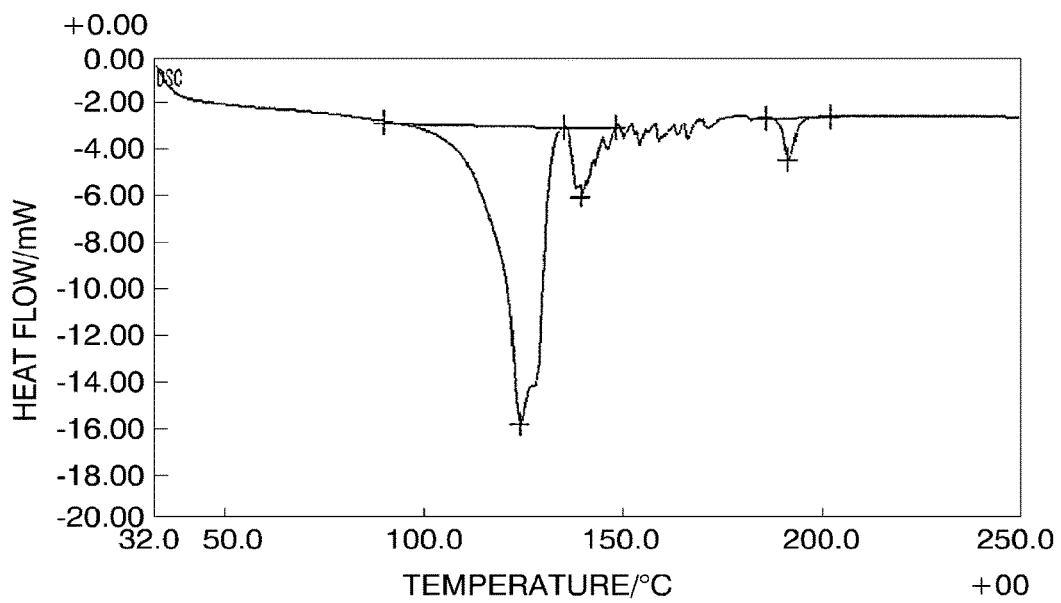
FIG. 6 is a graph showing the result of thermal analysis of a mixture of higher fatty acid metal salts contained in a powder coating prepared in Example 2 of the present invention.

In a powder coating of Example 2, a mixture of three kinds of higher fatty acid metal salts having melting point peaks at around 124° C., around 140° C., and around 192° C. as shown by the result of DSC thermal analysis in FIG. 6 was added in the same amount as that in Example 1 (0.1 mass %) to the base resin. The powder coating of Example 2 was otherwise prepared similarly to Example 1.

In a powder coating of Example 3, the same mixture of higher fatty acid metal salts as used in Example 1 and the same mixture of higher fatty acid metal salts as used in Example 2 were mixed at a mass ratio of 1:1, and the resultant mixture was added in the same amount as that in Example 1 (0.1 mass %) to the base resin. The powder coating of Example 3 was otherwise prepared similarly to Example 1.

Figure 7:
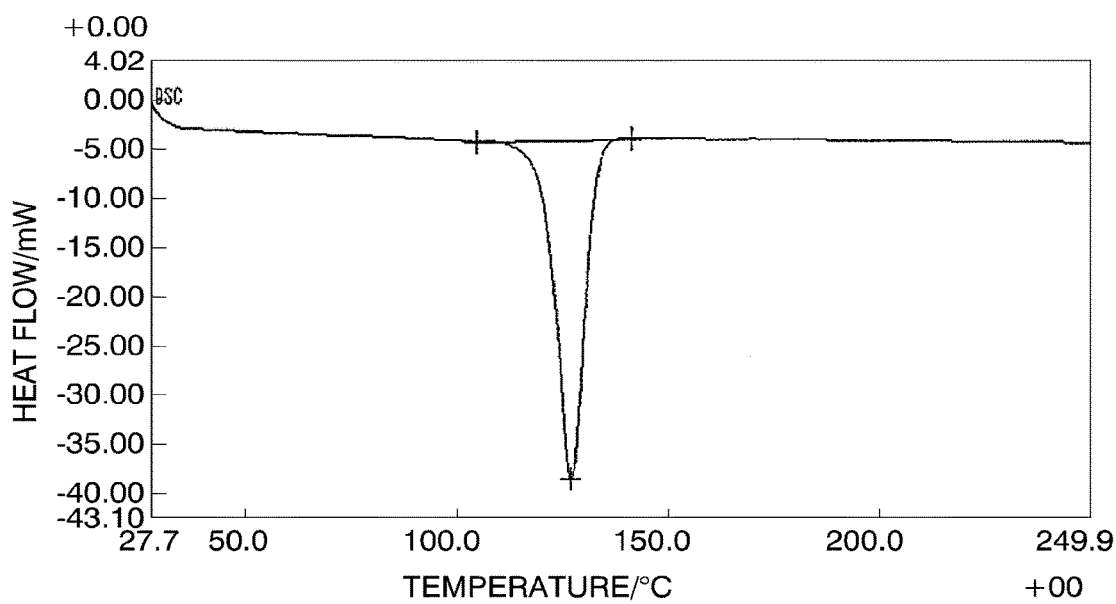
FIG. 7 is a graph showing the result of thermal analysis of a higher fatty acid metal salt contained in a powder coating prepared in Comparative Example 1 of the present invention.

In a powder coating of Comparative Example 1, only one kind of higher fatty acid metal salt having a melting point peak at around 127° C. as shown by the result of DSC thermal analysis in FIG. 7 was added in the same amount as that in Example 1 (0.01 mass %) to the base resin. The powder coating of Comparative Example 1 was otherwise prepared similarly to Example 1.

A powder coating of Comparative Example 2 was prepared similarly to Example 1 except that no higher fatty acid metal salt was used.

Hollow cylinder test pieces (outside diameter: 25.5 mm, inside diameter: 20 mm, and height: 15 mm) defined in "Testing Methods for Sliding Wear Resistance of Plastics" in Japanese Industrial Standards (JIS) K 7218: 1986 were produced as models of the resin coating layer by using the powder coatings of Examples 1 to 3 and Comparative Examples 1, 2 as a molding material.

A friction wear test was conducted with these test pieces according to the A method (Suzuki method, ring-on-disc friction wear testing method) described in JIS K 7218: 1986 (sliding speed: 0.5 m/s, applied load: 50 N, test time: 100 min, lubricating conditions: no lubrication). A disc made of S45C (carbon steel for machine structural use) was used as a counter material. The test temperature (ambient temperature) was room temperature (23° C.), 80° C., 120° C., and 140° C.

The height of each hollow cylinder test piece was measured before and after the friction wear test, and a change in height (μm) of each hollow cylinder test piece was obtained from the difference between the measured heights. A friction coefficient was obtained from the result of toque measurement by a torque detector incorporated in test equipment that carried out the friction wear test.

The results of Examples 1 to 3 and Comparative Examples 1, 2 are shown in the figures in the table below.

Figure 8A:
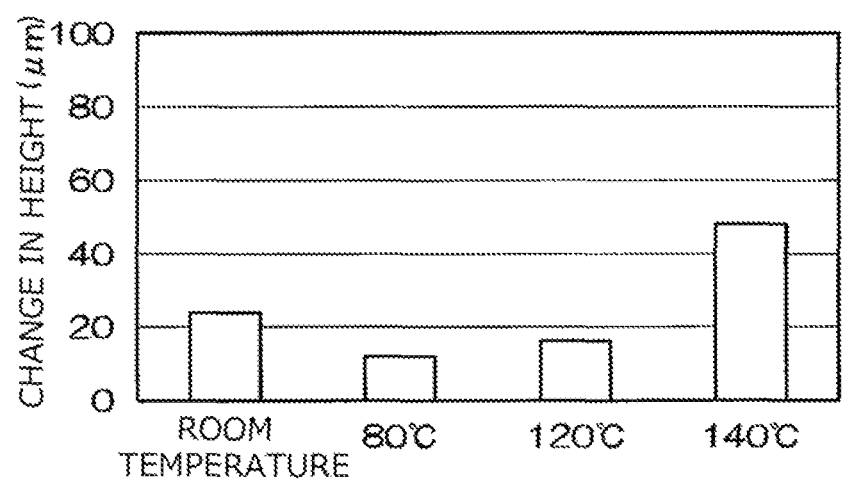
FIG. 8A is a graph showing the relation between the change in height and the test temperature in a friction wear test of hollow cylinder test pieces produced by using the powder coating prepared in Example 1.
Figure 8B:
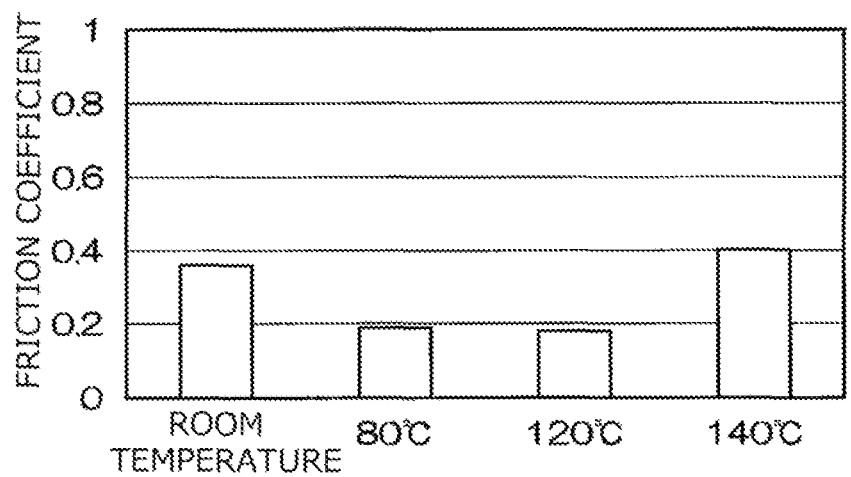
FIG. 8B is a graph showing the relation between the friction coefficient and the test temperature which was obtained by the friction wear test.
Figure 9A:
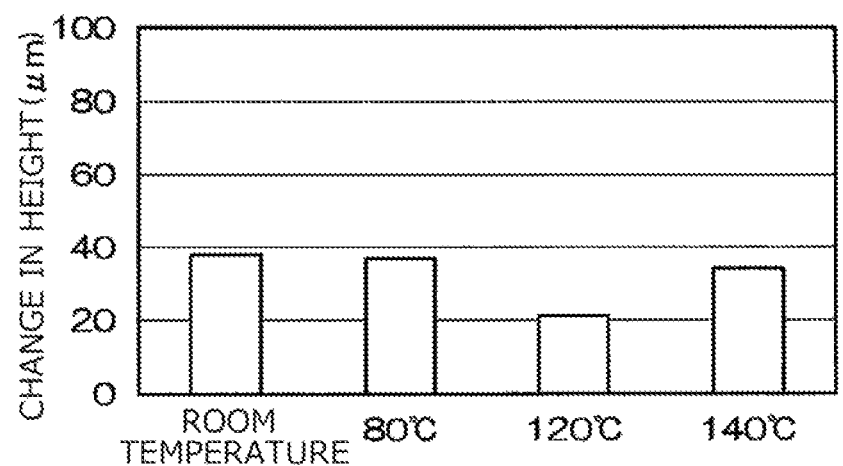
FIG. 9A is a graph showing the relation between the change in height and the test temperature in a friction wear test of hollow cylinder test pieces produced by using the powder coating prepared in Example 2.
Figure 9B:
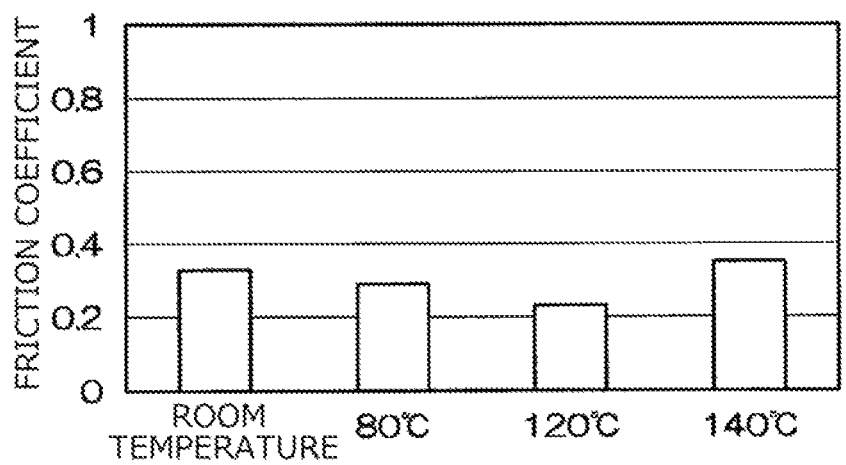
FIG. 9B is a graph showing the relation between the friction coefficient and the test temperature which was obtained by the friction wear test.
Figure 10A:
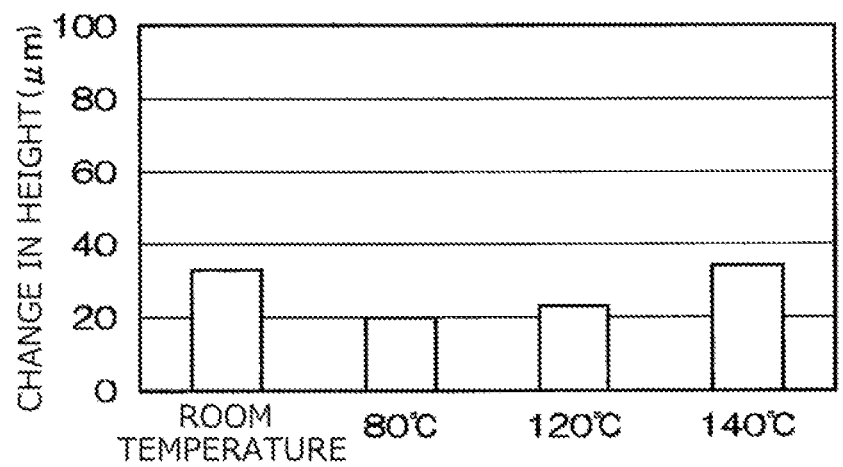
FIG. 10A is a graph showing the relation between the change in height and the test temperature in a friction wear test of hollow cylinder test pieces produced by using a powder coating prepared in Example 3 of the present invention.
Figure 10B:
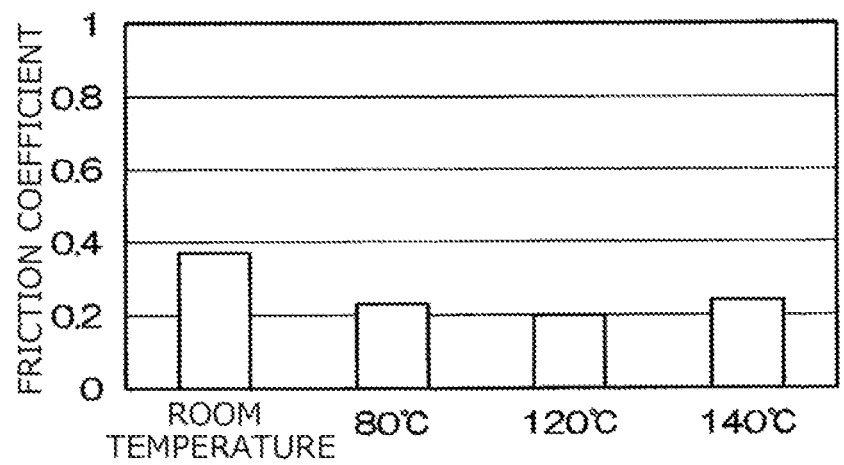
FIG. 10B is a graph showing the relation between the friction coefficient and the test temperature which was obtained by the friction wear test.
Figure 11A:
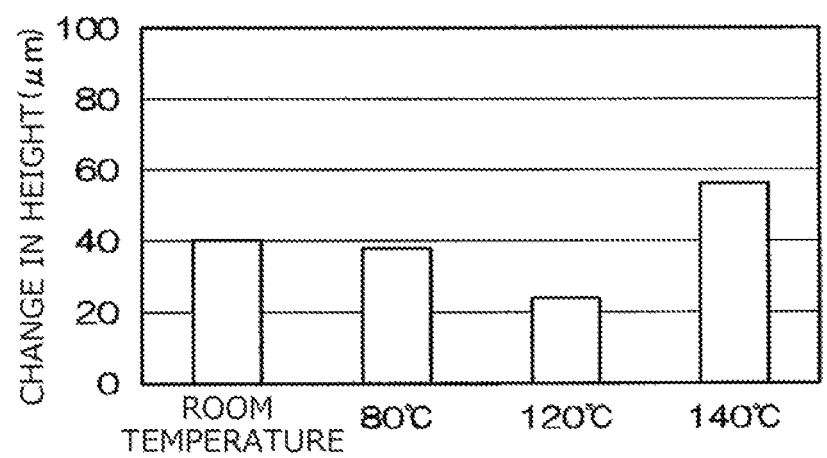
FIG. 11A is a graph showing the relation between the change in height and the test temperature in a friction wear test of hollow cylinder test pieces produced by using the powder coating prepared in Comparative Example 1.
Figure 11B:
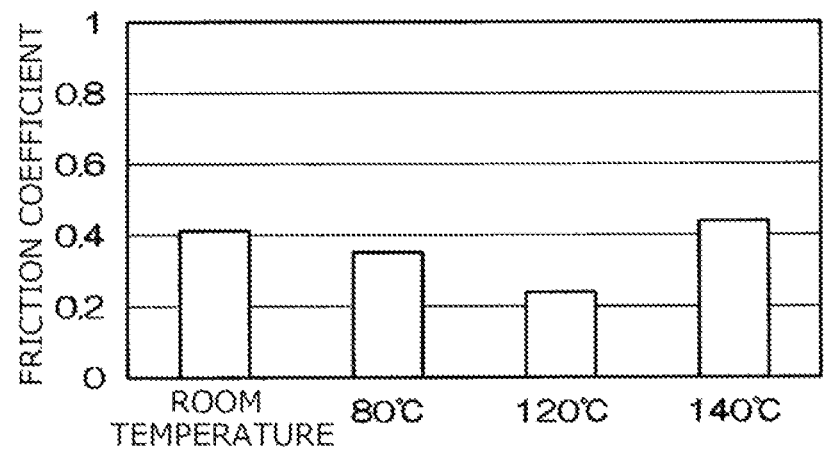
FIG. 11B is a graph showing the relation between the friction coefficient and the test temperature which was obtained by the friction wear test.
Figure 12A:
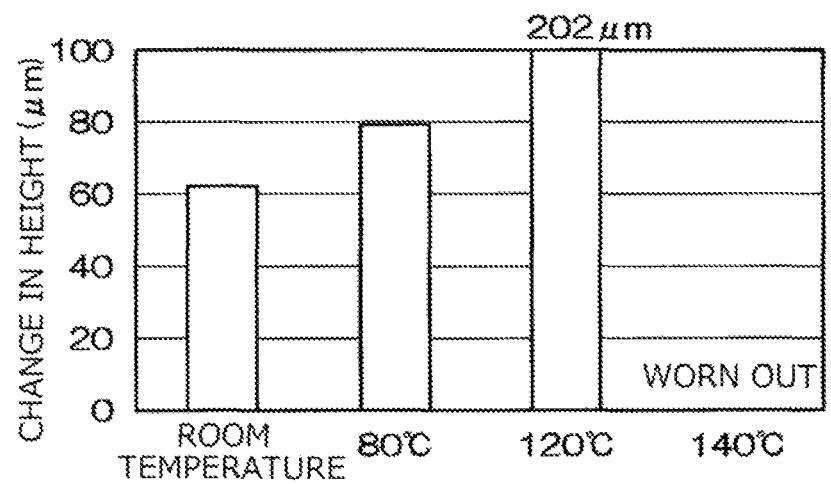
FIG. 12A is a graph showing the relation between the change in height and the test temperature in a friction wear test of hollow cylinder test pieces produced by using a powder coating prepared in Comparative Example 2 of the present invention.
Figure 12B:
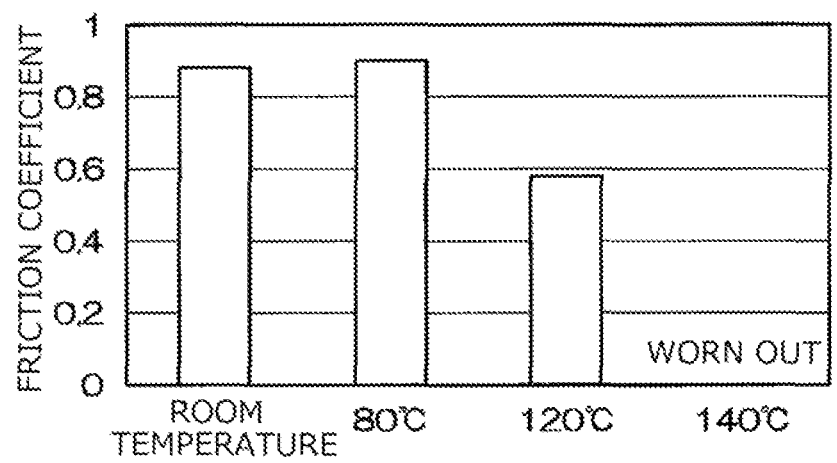
FIG. 12B is a graph showing the relation between the friction coefficient and the test temperature which was obtained by the friction wear test.

|  | Change in Height (μm) | Friction Coefficient |
| --- | --- | --- |
| Example 1 | FIG. 8A | FIG. 8B |
| Example 2 | FIG. 9A | FIG. 9B |
| Example 3 | FIG. 10A | FIG. 10B |
| Comparative Example 1 | FIG. 11A | FIG. 11B |
| Comparative Example 2 | FIG. 12A | FIG. 12B |

The results of FIGS. 12A and 12B show that, in the test pieces produced by using the powder coating of Comparative Example 2, namely the powder coating made of only the base resin and containing no higher fatty acid metal salt, both the friction coefficient and the change in height are large at any test temperature, and the change in height is significantly increased in a high temperature range of 120° C. or more (the test pieces were worn out at 140° C.). A change in height of a test piece is obtained by adding wear loss and the amount of creep deformation resulting from exposure of the test piece to high temperatures by a friction wear test. However, a change in height is caused by a high friction coefficient anyway.

The result of FIG. 12B shows that the test pieces produced by using the powder coating of Comparative Example 2 have a lower friction coefficient at 120° C. than at room temperature and 80° C. It was found from examination of the test pieces and the counter materials after testing at 120° C. that the base resin of the test pieces had adhered to the surfaces of the counter materials, which resulted in the reduction in friction coefficient due to sliding between the resins.

The results of FIGS. 8A to 11B show that, in the test pieces produced by using the powder coatings of Examples 1 to 3 and Comparative Example 1, namely the powder coatings containing the base resin and the higher fatty acid metal salt(s), both the friction coefficient and the change in height can be significantly reduced at every test temperature as compared to the test pieces produced by using the powder coating of Comparative Example 2. The reason why both the friction coefficient and the change in height are already small at room temperature in Examples 1 to 3 and Comparative Example 1 is due to exposure of the test pieces to high temperatures by the friction wear test as described above.

For example, according to measurement of the test pieces of Example 1, the temperature of the sliding surfaces of the test pieces increased up to 90° C. during the friction wear test even if the test was carried out at room temperature. It is therefore inferred that a lubricating film of the higher fatty acid metal salts was formed on the sliding surfaces of the test pieces due to this increase in temperature. The results of FIGS. 11A and 11B show that, in the test pieces produced by using the powder coating of Comparative Example 1, namely the powder coating containing the base resin and only one kind of higher fatty acid metal salt, a lubricating film of the higher fatty acid metal salt is still not sufficiently formed at room temperature. The lubricating film cannot be maintained at 140° C. due to phase transition of the higher fatty acid metal salt. Therefore, the friction coefficient and the change in height tend to be large at any test temperature in the test pieces of Comparative Example 1.

On the other hand, the results of FIGS. 8A to 10B show that, in the test pieces produced by using the powder coatings of Examples 1 to 3, namely the powder coatings containing the base resin and two or more kinds of higher fatty acid metal salts having different melting point peaks from each other, the friction coefficient and the change in height can be reduced at room temperature and 140° C. as compared to the test pieces produced by using the powder coating of Comparative Example 1. This shows that, in the test pieces produced by the powder coatings of Examples 1 to 3, the friction coefficient and the change in height can be reduced in a wider range of ambient temperatures as compared to the test pieces produced by using the powder coating of Comparative Example 1.

In the test pieces produced by using the powder coating of Example 1, the highest value of the melting point peaks of the higher fatty acid metal salts is as low as around 129° C. As shown by the results of FIGS. 8A and 8B, the friction coefficient and the change in height therefore tend to be slightly increased particularly at 140° C. in the test pieces produced by using the powder coating of Example 1. On the other hand, in the test pieces produced by using the powder coating of Example 2, the lowest value of the melting point peaks of the higher fatty acid metal salts is as high as around 124° C. As shown by the results of FIGS. 9A and 9B, the friction coefficient and the change in height therefore tend to be slightly increased particularly at room temperature and 80° C. in the test pieces produced by using the powder coating of Example 2.

As shown by the results of FIGS. 10A, 10B, in the test pieces produced by using the powder coating of Example 3, namely the powder coating containing the base resin and all the higher fatty acid metal salts used in Examples 1 and 2, the friction coefficient and the change in height can further be reduced in a wider range of ambient temperatures as compared to the test pieces of Examples 1 and 2.

What is claimed is:

1. An intermediate shaft incorporated in steering systems of automobiles, the intermediate shaft comprising:
   an inner shaft that has external splines formed on an outer periphery of the inner shaft;
   a tubular outer shaft that has internal splines formed on an inner periphery of the tubular outer shaft so as to be fitted on the external splines, the tubular outer shaft being coupled to the inner shaft by fitting so as to be slidable relative to the inner shaft in an axial direction; and a resin coating layer that is formed on a surface of the external splines or internal splines, the resin coating layer including a base resin and at least two types of higher fatty acid metal salts having different melting point peaks from each other, each of the at least two types of higher fatty acid metal salts having a melting point peak in a range of 80° C. to 140° C.

* * * * *